United States Patent [19]

Daubach et al.

[11] 4,213,900

[45] Jul. 22, 1980

[54] SPRAY-DRYING METHOD FOR THE PREPARATION OF WATER-DISPERSIBLE PULVERULENT DISPERSE DYE FORMULATIONS

[75] Inventors: Ewald Daubach, Ludwigshafen; Dieter Horn; Erwin Hahn, both of Heidelberg; Herbert Uhrig, Worms, all of Fed. Rep. of Germany

[73] Assignee: BASF Aktiengesellschaft, Ludwigshafen, Fed. Rep. of Germany

[21] Appl. No.: 925,527

[22] Filed: Jul. 17, 1978

[30] Foreign Application Priority Data

Jul. 19, 1977 [DE] Fed. Rep. of Germany ....... 2732500

[51] Int. Cl.$^2$ .......................... C09B 5/24; C09B 6/00; C09B 46/00
[52] U.S. Cl. .................................... 260/208; 260/155; 260/158; 260/205; 260/207; 260/325 R; 260/325 PH; 260/326 C; 260/373; 8/524; 8/639; 8/640; 8/642; 8/586; 8/643; 8/578; 8/611; 8/598
[58] Field of Search ............... 260/208, 155, 158, 205, 260/207, 325 R, 325 PH, 326, 373; 8/79, 25, 26, 27, 80, 83, 85 B, 86, 89 R, 90, 92, 93

[56] References Cited

U.S. PATENT DOCUMENTS

| | | | |
|---|---|---|---|
| 2,574,597 | 11/1951 | Salvin et al. | 8/79 |
| 3,967,922 | 7/1976 | Wolf et al. | 8/79 X |

OTHER PUBLICATIONS

Yamada et al., Chemical Abstracts, vol. 88, #24327e (1978).

*Primary Examiner*—Floyd D. Higel
*Attorney, Agent, or Firm*—Oblon, Fisher, Spivak, McClelland & Maier

[57] ABSTRACT

Easily water-dispersible pulverulent formulations of disperse dyes are prepared by spray-drying a dye solution which comprises
(a) one or more disperse dyes,
(b) one or more water-soluble anionic dispersants,
(c) from 0 to 20% by weight, based on (a+b+c+d), of other surfactants and
(d) from 0 to 20% by weight, based on (a+b+c+d) of agents which serve as protective colloids (the proportion of (c+d) being at most 20% by weight).

Suitable solvents (e) are formic acid, formamide, N-methylformamide, butyrolactone, ethylene glycol and propylene glycol, which may in addition contain up to 100% by weight, based on (e), of N,N-dimethylformamide or acetic acid or mixtures of these. The formulations obtained by the above process contain the dye in very fine dispersion.

13 Claims, No Drawings

SPRAY-DRYING METHOD FOR THE PREPARATION OF WATER-DISPERSIBLE PULVERULENT DISPERSE DYE FORMULATIONS

BACKGROUND OF THE INVENTION

1. Field of the Invention

The present invention relates to a process for the preparation of a water-dispersible pulverulent disperse dye formulation by spray-drying, and to the formulation obtainable by the process and to its use for dyeing synthetic fiber material.

2. Brief Description of the Prior Art

Synthetic water-insoluble dyes, e.g. disperse dyes or vat dyes, are converted, for use in dyeing textiles from an aqueous liquor, into formulations which on simple addition to water, or stirring into water, give a finely dispersed dye suspension. The preparation of such readily dispersible dye formulations is also described as finishing.

Depending on whether pulverulent or liquid dye formulations are to be prepared, the assistants, i.e. dispersants, used in finishing have to conform to different requirements.

The dispersion process, i.e. the formation of the fine dye particles, can be carried out by milling an aqueous suspension in the presence of dispersants, with or without additional assistants, e.g. protective colloids, wetting agents and the like. In general, the dispersion process is carried out in conventional comminution equipment, e.g. ball mills or high-speed mills such as attrition mills, sand mills or bead mills, which contain glass balls, porcelain balls, steel balls, quartz sand or plastic beads as the grinding medium.

The dispersant is intended to increase the rate of dispersion during comminution and to prevent reagglomeration of the comminuted (dispersed) particles, and recrystallization to form large particles. In the case of the preparation of pulverulent formulations, the dispersant must stabilize the aqueous dispersion until the latter is converted to a dry state, for example by spray-drying, and must prevent agglomeration of the finely dispersed particles from occurring during the brief drying process and during the subsequent storage of the pulverulent formulation. The state of fine dispersion obtained on drying persists for a long time if the ratio of dispersed dye to the dispersant does not exceed a certain ratio.

Summary of the Invention

It is an object of the present invention to provide a process for the preparation of readily water-dispersible pulverulent disperse dye formulations, by means of which the expensive fine comminution of the crude dyes, required by the processes of the prior art, can be circumvented.

We have found that readily water-dispersible pulverulent formulations of disperse dyes may be obtained by spray-drying a solution which comprises (a) one or more disperse dyes, (b) one or more water-soluble anionic dispersants, (c) from 0 to 20% by weight, based on (a+b+c+d), of further surfactants and (d) from 0 to 20% by weight, based on (a+b+c+d), of agents which serve as protective colloids, the sum (c+d) being not greater than 20% by weight, dissolved in (e) formic acid, formamide, N-methylformamide, butyrolactone, ethylene glycol, propylene glycol or a mixture of these and (f) from 0 to 100% by weight, based on (e), of N,N-dimethylformamide, acetic acid or a mixture of these.

The process of the invention gives pulverulent formulations which contain the dye in a state of very fine division and which can readily be redispersed by sprinkling into water and stirring. The products obtained may be used for both dyeing and printing synthetic fiber material, especially polyester material.

According to the invention, the process is carried out by preparing a solution of (a) and (b) in the solvent (e), in the presence or absence of (f). This solution may in addition contain the constituents (c) or (d) or (c) and (d). The resulting solution is then converted to a powder by spray-drying, after removing any insoluble constituents.

Examples of suitable disperse dyes (a) are those of the azo series, dyes of the series of the quinophthalones and their water-insoluble derivatives, anthraquinone dyes and dyes from other catagories of compounds which are sparingly soluble in water and are absorbed on synthetic fibers from an aqueous liquor, and mixtures of such dyes.

Suitable anionic dispersants (b) are those conventionally used for the preparation of dye formulations, eg. alkali metal salts of ligninsulfonic acids, of phenol/formaldehyde/alkali metal sulfite condensation products and phenolsulfonic acid/formaldehyde/urea condensation products and the condensation products obtained by post-condensing these with phenol and formaldehyde, alkali metal salts of condensation products of 2-naphthalenesulfonic acid with formaldehyde, of copolymers of styrene and maleic acid or maleic anhydride (in the ratio of from 52:48 to 70:30 by weight), of copolymers of styrene and acrylic acid (in the ratio of from 50:50 to 70:30 by weight) or of copolymers of vinyl ethers, preferably vinyl methyl ether or vinyl butyl ether, and maleic acid or maleic anhydride (in the ratio of 40:60 to 70:30 by weight), or mixtures of these dispersants.

The requisite amount depends especially on the particular dye. Dyes which tend to undergo recrystallization require a larger amount of (b), so as to prevent the dye from forming sizable crystals during drying.

In addition, the dispersant must prevent agglomeration of the finely divided dye in the pulverulent formulation during storage.

The amount of dispersant (b) and of additional agents (c) and (d) is therefore as a rule from 100 to 900% by weight, advantageously from 100 to 400% by weight, based on (a), i.e. the ratio of (a) to (b+c+d) is selected so that the formulations obtained after spray-drying contain from 10 to 50% by weight of (a) and from 50 to 90% by weight of (b+c+d).

As additional assistants, the formulation may contain a surfactant (c) which in particular acts as a wetting agent. Examples of such surfactants are the alkali metal salts of alkylbenzenesulfonic acids (where alkyl is of 4 to 20 carbon atoms) or of alkylnaphthalenesulfonic acids (where alkyl is of 4 to 10 carbon atoms), and adducts of from 6 to 20 moles of ethylene oxide with alkylphenols (where alkyl is of 8 to 14 carbon atoms). Specific examples are the alkali metal salts of octylbenzenesulfonic acid, nonylbenzenesulfonic acid, dodecylbenzenesulfonic acid and butylnaphthalenesulfonic acid, adducts of from 6 to 20 moles of ethylene oxide with octylphenol, nonylphenol or dodecylphenol, and mixtures of these compounds.

The proportion of surfactant (c) is at most 20, preferably from 0 to 10, % by weight based on the formulation (a+b+c+d).

In addition, the formulation can contain an agent (d) which serves as a protective colloid. Examples of such agents are polyvinyl alcohol and copolymers of styrene acrylic acid. The amount of (d) is at most 20, preferably from 0 to 10, % by weight based on the formulation (a+b+c+d).

Where the formulation contains both a surfactant (c) and an agent (d) which serves as a protective colloid, the total amount of (c+d) must not exceed 20% by weight, based on (a+b+c+d), since otherwise a tacky product is obtained on spray-drying.

Suitable solvents (e) are formic acid, formamide, N-methylformamide, butyrolactone, ethylene glycol, propylene glycol and mixtures of these. The said solvents adequately dissolve the dyes (a), the dispersants (b), the surfactants (c) and the agents (d). Formic acid and butyrolactone have a particularly good solvent power and are therefore preferred as (e).

The amount of (e) depends on the component which is least soluble in the solvents, since the formulation obtained by spray-drying must contain a certain ratio of (a) to (b). As a rule, the amount of solvent depends on the dye (a). In general, the amount of solvents (e) and (f) which is required is from 5 to 40, preferably from 8 to 20, times the amount by weight of (a).

In a number of cases it is advantageous to use a mixture of (e) and (f) as the solvent, since N,N-dimethylformamide and acetic acid have a high solvent power for a number of dyes, but only a low solvent power for (b). The ratio of (e) to (f) is determined by the need for (a) and (b) to dissolve in an amount of solvent acceptable for industrial operation of the process. Hence, only as much (f) is used as is needed to give a sufficient concentration of dye relative to the dissolved dispersant. For this reason, not more than 100% by weight, preferably up to 60% by weight, based on (e), of N,N-dimethylformamide, acetic acid or a mixture of these is used.

The spray-drying of the solutions is carried out on conventional spray-dryers with gas entry temperatures of from 70° to 180° C. The temperatures depend on the heat sensitivity of the dyes.

The solvents evaporated during drying are recovered in the conventional manner or by conventional methods and can be reused, if necessary after fractional distillation.

If a sufficient amount of dispersant is used, the process gives extremely finely divided products which cannot be achieved, or can only be achieved at extreme expense, by milling in accordance with a prior art process.

From an economic point of view, the process of the invention has the advantage that it does not require any dispersing equipment and that therefore there is no expense in providing mechanical energy.

The Examples which follow illustrate the process of the invention. The state of division of the dye in the formulations obtained was determined by the centrifugal sedimentation test of Richter and Vescia, Melliand Textilberichte 1965, 622 et seq., and is reported as centrifugal sedimentation values.

EXAMPLE 1

A solution of 40 g of the dye of the formula

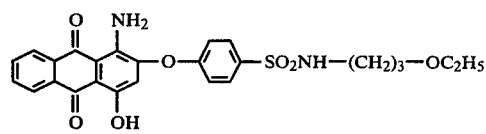

and 60 g of the dispersant obtainable as described in Example 2 of German Pat. No. 2,301,638, in 400 g of formic acid, is dried in a spray tower (gas entry temperature 110° C., gas exit temperature 60° C.).

A pulverulent formulation containing the dye in a state of very fine subdivision is obtained.

The centrifugal sedimentation values are 1, 2, 3, 94.

The formulation is very suitable for all applications, for example for dyeing and printing polyester fiber material.

The same result is obtained if the formic acid is replaced by the same amount of formamide.

EXAMPLE 2

A solution of 33 g of the dye of the formula

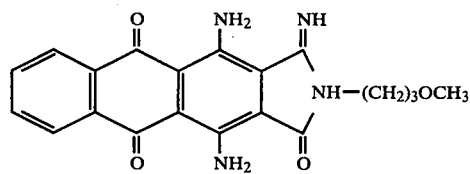

and 66 g of the dispersant obtainable as described in Example 2 of German Pat. No. 2,301,638, in 400 g of formamide, is spray-dried as described in Example 1. The resulting formulation gives the following centrifugal sedimentation values: 20, 15, 15, 50.

The same result is obtained if instead of formamide the same amount of formic acid is used.

EXAMPLE 3

The procedure described in Example 2 is followed, but the dye used is 33 g of the dried compound of the formula

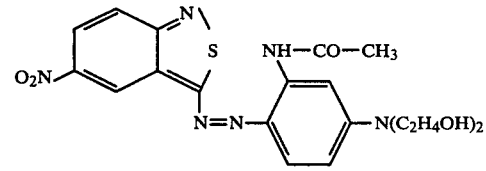

Centrifugal sedimentation values: 12, 17, 8, 63.

EXAMPLE 4

20 g of the dye referred to in Example 1 and 80 g of the dispersant obtainable as described in Example 1 of German Pat. No. 2,301,638 are dissolved in 200 g of formic acid and the solution is passed through a sieve with 15,000 meshes/cm². The clear solution is dried in a spray-dryer (gas entry temperature 150° C.). A pulverulent formulation is obtained which disperses well on stirring into water and which can be used for any dyeing process, e.g. thermosol dyeing or package dyeing, and for textile printing.

The centrifugal sedimentation values were 3, 2, 5, 90. This state of fine subdivision persisted even after storing the formulation for 3 days at 60° C.

EXAMPLE 5

30 g of 1-amino-2-phenoxy-4-hydroxyanthraquinone and 70 g of the sodium salt of a copolymer of vinyl methyl ether and maleic acid (in the molar ratio of 1:1) are dissolved in 200 g of formic acid and 50 g of ethylene glycol. The solution is filtered and then dried in a spray tower (gas entry temperature 120° C.).

The resulting powder contains the dye in a very fine state of subdivision. The centrifugal sedimentation values are 5, 14, 26, 55.

The powder disperses on stirring into water and can be used for dyeing and printing polyester fiber material.

EXAMPLE 6

The procedure described in Example 5 is followed, except that 30 g of the dye described in Example 1 are used.

A pulverulent formulation which contains the dye in a state of fine subdivision is obtained, the centrifugal sedimentation values being 5, 13, 26, 56.

EXAMPLE 7

20 g of the dye of the formula $$O_2N-\underset{Cl}{\underset{|}{\bigcirc}}-N=N-\underset{CH_3}{\underset{|}{\bigcirc}}-N\underset{C_2H_5}{\overset{C_2H_4CN}{<}}$$

and 80 g of a dispersant (obtained by condensing phenolsulfonic acid, urea and formaldehyde in the molar ratio of 1:1:1.9 and post-condensing the reaction product with a condensation product of phenol and formaldehyde in the molar ratio of 1:1) are dissolved in 400 g of formic acid. The solution is filtered and dried in a spray-dryer (gas entry temperature 130° C.).

The powder contains the dye in a state of very fine subdivision and gives centrifugal sedimentation values of 1, 6, 19, 74).

The formulation readily disperses on stirring into water and is very suitable for dyeing and printing polyester fibers.

EXAMPLE 8

20 parts of the dried coupling product of 3-amino-5-nitro-2,1-benzisothiazole with N-(β-carbomethoxyethyl)-N-ethylaniline and 80 g of the dispersant obtainable as described in Example 1 of German Pat. No. 2,301,638 are dissolved in a mixture of 150 g of formic acid and 150 g of 100% strength acetic acid. After filtering, the clear solution is dried in a spray dryer, with a gas entry temperature of 150° C.

The resulting powder contains a dye in a state of fine subdivision and gives centrifugal sedimentation values of 10, 15, 20, 55.

EXAMPLE 9

30 g of the dye of the formula $$O_2N-\underset{Br}{\overset{Br}{\bigcirc}}-N=N-\bigcirc-N\underset{C_2H_5}{\overset{C_2H_4CN}{<}}$$

20 g of the sodium salt of a copolymer of styrene and acrylonitrile (in the ratio of 70:30 by weight) and 50 g of the sodium salt of a condensation product of 2-naphthalenesulfonic acid and formaldehyde are dissolved in 300 g of formic acid. After filtering, the clear solution is dried in a spray-dryer with a gas entry temperature of 120° C. A pulverulent formulation is obtained, in which the dye is present in a finely divided and easily dispersible state; the centrifugal sedimentation values are 9, 10, 11, 70.

EXAMPLE 10

20 g of the dye of the formula $$O_2N-\bigcirc-N=N-\underset{\underset{CH_3}{|}}{\overset{HO}{\bigcirc}}$$

40 g of sodium ligninsulfonate and 40 g of the sodium salt of a condensation product of naphthalene-2-sulfonic acid and formaldehyde are dissolved in a mixture of formic acid and N,N-dimethylformamide (in the ratio of 3:1 by weight). The solution is filtered and then dried in a spray tower, with a gas entry temperature of 120° C.

The resulting powder contains the dye in a state of fine subdivision and gives centrifugal sedimentation values of 7, 3, 3, 87.

The formulation is readily dispersible in water and is very suitable for dyeing and printing polyester material.

EXAMPLE 11

30 g of the dried coupling product of 2,4-dinitro-6-bromoaniline and 2-methoxy-5-acetylamino-N-cyanoethyl-N-hydroxyethylaminobenzene and 70 g of the dried dispersant obtainable as described in Example 1 of German Pat. No. 2,301,638 are dissolved in 300 g of a mixture of butyrolactone and N,N-dimethylformamide (in the ratio of 1:1 by weight). The solution is filtered and is then dried in a spray dryer, with a gas entry temperature of 180° C.

A pulverulent dye formulation is obtained, which is suitable for dyeing and printing polyester fibers and contains the dye in a state of fine subdivision; the centrifugal sedimentation values are 18, 19, 23, 40.

EXAMPLE 12

10 g of the dye referred to in Example 1 and 90 g of the sodium salt of a copolymer of styrene and acrylic acid (in the ratio of 60:40 by weight) are dissolved in formic acid. The solution is filtered and dried in a spray-dryer, with a gas entry temperature of 110° C. and a gas exit temperature of 60° C.

A pulverulent formulation containing the dye in a state of very fine subdivision is obtained. The mean particle size of the dye, after redispersion in water, is less than 0.1 μm.

We claim:

1. A process for the preparation of a water-dispersible pulverulent formation of a disperse dye, which comprises preparing a solution which comprises:
   (a) one or more disperse dyes,
   (b) one or more water-soluble anionic dispersants,
   (c) from 0 to 20% by weight, based on (a+b+c+d), of further surfactants and
   (d) from 0 to 20% by weight, based on (a+b+c+d), of agents which serve as protective colloids, the sum (c+d) being not greater than 20% by weight, dissolved in
   (e) formic acid, formamide, N-methylformamide, butyrolactone, ethylene glycol, propylene glycol or a mixture of these and
   (f) from 0 to 100% by weight, based on (e), of N,N-dimethylformamide, acetic acid or a mixture of these; and spray-drying said solution.

2. A process as claimed in claim 1, wherein the solvent (e) is formic acid, butyrolactone or a mixture of these.

3. A process as claimed in claim 1, wherein (e) is formic acid or butyrolactone and is mixed with up to 100% by weight (based on (e)) of N,N-dimethylformamide or acetic acid.

4. A process as claimed in claim 1 or 3, wherein the amount of solvents (e) and (f) is from 5 to 40 times the amount of (a+b+c+d).

5. A process as claimed in claim 1 or 3, wherein the formulation contains from 10 to 50% by weight of (a) and from 90 to 50% by weight of (b+c+d).

6. A process as claimed in claim 1, wherein (a) is a disperse dye of the azo series, an anthraquinonoid disperse dye, a disperse dye of the quinophthalone series or some other sparingly water-soluble dye which is absorbed on synthetic fibers from an aqueous liquor, or a mixture of such dyes.

7. A process as claimed in claim 1, wherein (b) is an alkali metal salt of a ligninsulfonic acid, of a phenol/formaldehyde/alkali metal sulfite condensation product, of a phenolsulfonic acid/formaldehyde/urea condensation product which has been post-condensed with phenol and formaldehyde, of a condensation product of 2-naphthalenesulfonic acid and formaldehyde, of a styrene/maleic acid or styrene/maleic anhydride copolymer (in the ratio of from 52:48 to 70:30 by weight, of a vinyl ether/maleic acid copolymer (in the ratio of from 40:60 to 70:30 by weight), or of a styrene/acrylic acid copolymer (in the ratio of from 50:50 to 70:30 by weight), or a mixture of these.

8. A process as claimed in claim 1, wherein (c) is an alkali metal salt of an alkylbenzenesulfonic acid (where alkyl is of 4 to 20 carbon atoms) or of an alkylnaphthalenesulfonic acid (where alkyl is of 4 to 10 carbon atoms), or an adduct of from 6 to 20 moles of ethylene oxide with an alkylphenol (where alkyl is of 8 to 14 carbon atoms).

9. A process as claimed in claim 1, wherein (d) is polyvinyl alcohol or a copolymer of acrylic acid and styrene.

10. A process as claimed in claim 1, wherein from 100 to 900% by weight of (b+c+d), based on (a), are used.

11. A process as claimed in claim 1, wherein from 100 to 400% by weight of (b+c+d), based on (a), are used.

12. A process as claimed in claim 1, wherein from 0 to 10% by weight of (c), based on (a+b+c+d), are used.

13. A process as claimed in claim 1, wherein from 0 to 10% by weight of (d), based on (a+b+c+d), are used.

* * * * *